United States Patent
Kim et al.

(10) Patent No.: US 7,420,764 B2
(45) Date of Patent: *Sep. 2, 2008

(54) SERVO CONTROLLER METHOD AND APPARATUS FOR HIGH TRACKS PER INCH HARD DISK DRIVES USING A DELAY ACCOMODATING STATE ESTIMATOR

(75) Inventors: Young-Hoon Kim, Santa Clara, CA (US); Sang Hoon Chu, Santa Clara, CA (US); Seong-Woo Kang, San Jose, CA (US); Dong-Ho Oh, San Jose, CA (US); Yun-Sik Han, Santa Clara, CA (US); Tae Yeon Hwang, Kyunggi (KR)

(73) Assignee: Samsung Eletronics Co., Ltd., Suwon (KR)

( * ) Notice: Subject to any disclaimer, the term of this patent is extended or adjusted under 35 U.S.C. 154(b) by 150 days.

This patent is subject to a terminal disclaimer.

(21) Appl. No.: 11/397,254

(22) Filed: Apr. 3, 2006

(65) Prior Publication Data
US 2006/0187571 A1 Aug. 24, 2006

Related U.S. Application Data

(63) Continuation of application No. 10/903,720, filed on Jul. 29, 2004, now Pat. No. 7,031,095.

(51) Int. Cl.
*G11B 5/596* (2006.01)

(52) U.S. Cl. .............. 360/77.02; 360/78.07; 360/78.09

(58) Field of Classification Search .............. None
See application file for complete search history.

(56) References Cited

U.S. PATENT DOCUMENTS 5,369,345 A * 11/1994 Phan et al. .................. 318/561
5,510,939 A *  4/1996 Lewis ....................... 360/78.09
5,585,976 A * 12/1996 Pham ....................... 360/77.04

* cited by examiner

*Primary Examiner*—Andrew L. Sniezek
(74) *Attorney, Agent, or Firm*—Earle Jennings; GSS Law Group

(57) ABSTRACT

The invention applies to servo controllers for at least the voice coil motor of a hard disk drive. Today, many control algorithms require 80 to 90 percent of the sampling period to complete their calculation of the next control, making computation time delay no longer negligible. The invention accommodates the transport delay, such as computation time delay, into the state estimator and into the whole control system. Experimental results using a commercial hard drive, as well as simulation results, show that the invention's method effectively improves the hard disk drive control system stability by increasing the phase margin and gain margin. The invention includes the method of operating the servo-controller, as well as the apparatus implementing that method. The invention also includes hard disk drives containing servo-controllers implementing the method, and program systems residing in accessibly coupled memory to a computer within the servo controller implementing the method.

21 Claims, 9 Drawing Sheets

SERVO CONTROLLER METHOD AND APPARATUS FOR HIGH TRACKS PER INCH HARD DISK DRIVES USING A DELAY ACCOMODATING STATE ESTIMATOR

CROSS REFERENCE TO RELATED APPLICATIONS

This application is a continuation of U.S. patent application Ser. No. 10/903,720 filed Jul. 29, 2004 now U.S. Pat. No. 7,031,095.

BACKGROUND OF THE INVENTION

1. Field of the Invention

This invention relates to the servo controller operating at least the voice coil of a voice coil actuator in a hard disk drive.

2. Background Information

Modern hard disk drives include a servo controller driving at least a voice coil actuator to position a read-write head near a track on a rotating disk surface. The read-write head communicates with the servo controller, providing feedback, which is used in controlling the read-write head's positioning near the track. The read-write head is embedded in a slider, which floats, on a thin air bearing, a very short distance above the rotating disk surface.

A voice coil actuator typically includes a voice coil, which swings at least one actuator arm in response to the servo controller. Each actuator arm includes at least one head gimbal assembly typically containing a read-write head embedded in a slider. The head gimbal assembly couples through a load beam to the actuator arm in the voice coil actuator. The read-write heads mount on head gimbal assemblies, which float on the thin air bearing off the hard disk drive surface when in operation. The air bearing is formed by the rotating disk surface and the slider attached to the head gimbal assembly.

A hard disk drive may have one or more disks. Each of the disks may have up to two disk surfaces in use. Each disk surface in use has an associated slider, with the necessary actuator arm. One actuator arm typically supports one or two sliders. Hard disk drives typically have only one voice coil actuator.

Often there is one slider for a given hard disk drive surface. There are usually multiple heads in a single hard disk drive, but for economic reasons, usually only one voice coil actuator.

Voice coil actuators are further composed of a fixed magnet which interacts with a time varying electromagnetic field induced by a voice coil. This provides a lever action via an actuator axis. The lever action acts to move the actuator arm(s), positioning the head gimbal assembly(ies) over specific tracks with speed and accuracy. Actuators often include the voice coil, the actuator axis, the actuator arms and the head gimbal assemblies. An actuator may have as few as one actuator arm. A single actuator arm may connect with two head gimbal assemblies, each with at least one head slider.

Typically, a slider is rigidly attached to a head suspension to make a head gimbal assembly. The attachment of the slider is through a flexure, which provides an electrical interconnection between the read-write head in the slider and the disk controller.

The hard disk drive controller controls the voice coil to position the read-write head over a track above a rotating disk surface. In a typical hard disk drive control system, the state-space controller/observer (or estimator) design is frequently used. This approach has advantages, such as effective filtering of position and velocity, use of an estimation error to handle servo defects, etc. A state space controller is generally regarded as a control mechanism exerting a control, based upon feedback and an internal state. The feedback often includes a Position Error Signal (PES).

These state-space or discrete-time state estimators are typically implemented in one of two forms. One form is the so-called prediction estimator that estimates the state variable based on the plant output and control of the previous sampling period. The other form is called the current estimator, which comes from the use of the current time measurement to estimate the state variables. The plant as used herein refers to the voice coil actuator interacting with the rotating disk surface(s) to create the measured current read-write head position Ycur.

Prediction estimator equations have a more direct relationship with the internal dynamics of the hard disk drive. The prediction estimator equations are a discrete time step form of a continuous-time state observer model. However, the current estimator equations can be derived by means of a discrete Kalman filter formalism with a predetermined knowledge of the current measurements. Today, the current estimator is the predominant hard disk drive servo control model. This is due to the belief that its estimates are more reliable for small computational delays.

As the track density (measured tracks-per-inch, or TPI) of hard disk drives increases, the requirement for servo positioning accuracy increases. This requirement forces the sampling rate to also be increased. At the same time, more sophisticated control algorithms need to be used to minimize the Track Mis-Registration (TMR) as the track density, TPI, increases.

The inventors have discovered that a number of previously held and unquestioned assumptions regarding at least computational delays are no longer true. The computation time delay is no longer negligibly small. It needs to be accounted for in the design of the servo controller.

A portion of each hard disk drive's accessible data is reserved to identify the read-write head location. Increasing the sampling rate above certain thresholds requires reducing the data available for use by a computer accessing the hard disk drive, which reduces its market value. This market constraint significantly limits the sampling frequency, while at the same time, the TPI continues to grow.

Control systems need to account for these new and previously insignificant realities in hard disk drives, without unnecessarily increasing the data overhead to support increased sampling rates.

BRIEF SUMMARY OF THE INVENTION

The invention applies to servo controllers in hard disk drives, which control at least a voice coil motor positioning a read-write head to access a track on a rotating disk surface.

Today's hard disk drive control systems tend to use A/D sampling in the range of 24K samples per second. Contemporary control algorithms can require 80 to 90 percent of the sampling period to complete their calculation of the next control. For these reasons, the computation time delay is no longer negligibly small.

The invention includes simple, yet systematic techniques, accounting for the transport delay, which may include a computation time delay, in the state estimator and the whole control system.

The transport delay is defined herein as the time lag between the idealized time of hard disk drive plant output (position) sampling and the time at which the corresponding control becomes effective at the input of our design-oriented plant model. The transport delay may include the analogue-to-digital (and vice-versa) conversion time, demodulation time, computational time, time-lag due to finite bandwidth power amplification, etc..

Experimental results using a commercial hard drive, as well as simulation results, show that the inventive method effectively improves the hard disk drive control system stability by increasing the phase margin and the gain margin.

The invention accounts for the transport delay, and may provide increased reliability and improved performance today, and as the TPI continues to increase.

The invention includes the method of operating the servo-controller, as well as the apparatus implementing that method. The invention also includes hard disk drives containing servo-controllers implementing the method, and program systems residing in accessibly coupled memory to a computer within the servo controller implementing the method.

These and other advantages of the present invention will become apparent upon reading the following detailed descriptions and studying the various figures of the drawings.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors for carrying out the invention. Various modifications, however, will remain readily apparent to those skilled in the art, since the generic principles of the present invention have been defined herein.

Today's hard disk drive control systems tend to use A/D sampling in the range of 24K samples per second. Contemporary control algorithms can require 80 to 90 percent of the sampling period to complete their calculation of the next control. For these reasons, the computation time delay is no longer negligibly small.

Figure 1A:
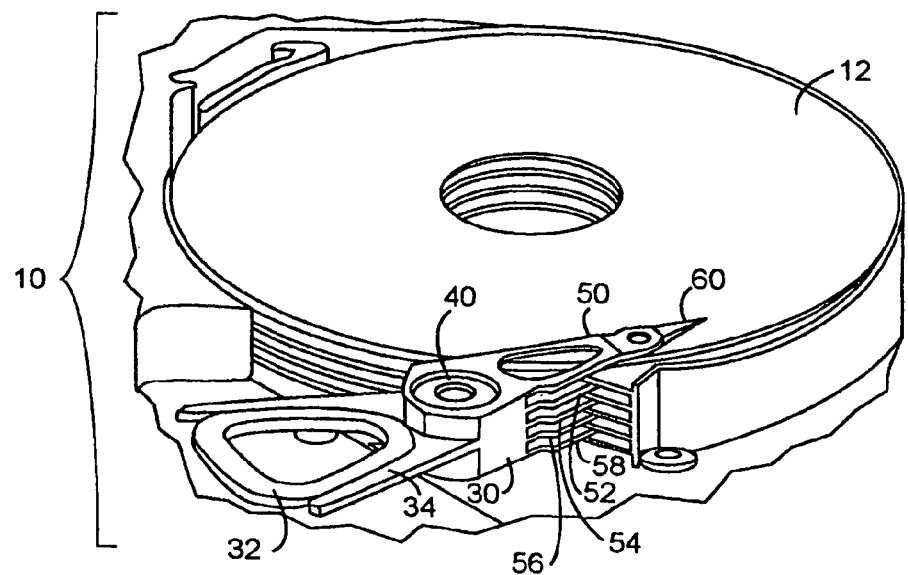
FIGS. 1A and 1B show a contemporary hard disk drive in which the invention can provide advantage.

FIG. 1A shows a contemporary hard disk drive 10 including the actuator 30 with the voice coil 32, the actuator axis 40, the actuator arms 50-56 and with the head gimbal assembly 60 placed among the disks. The invention can provide advantage to this hard disk drive.

Figure 1B:
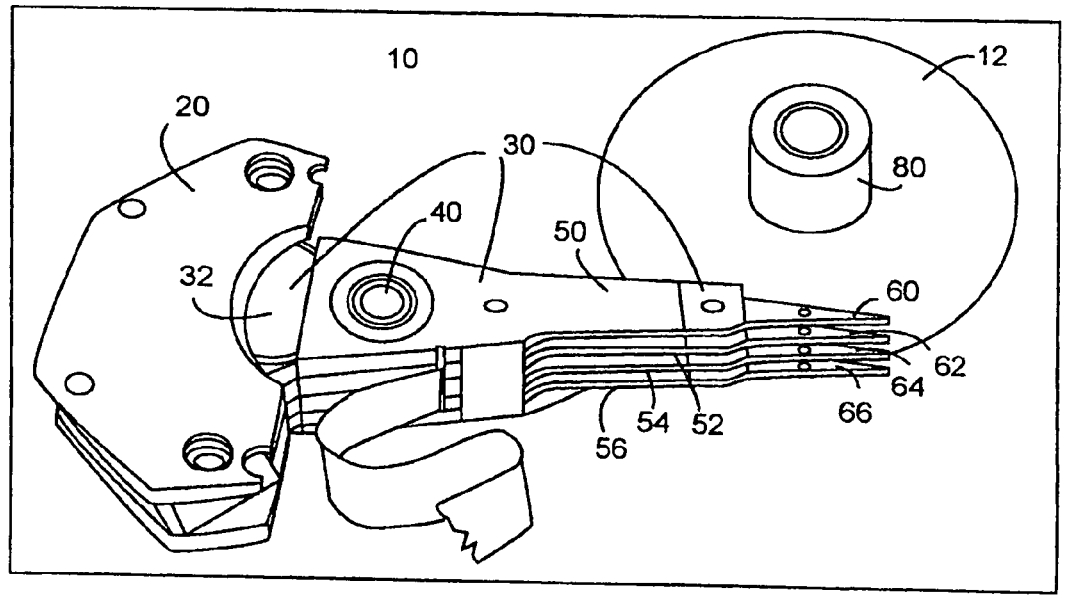

FIG. 1B shows the hard disk drive 10 of FIG. 1A, with the fixed magnetic 20 interacting with the actuator assembly 30 with the disks removed. The actuator assembly 30 includes the voice coil 32, the actuator axis 40, the actuator arms 50-56 and the head gimbal assembly 60-66.

Figure 2A:
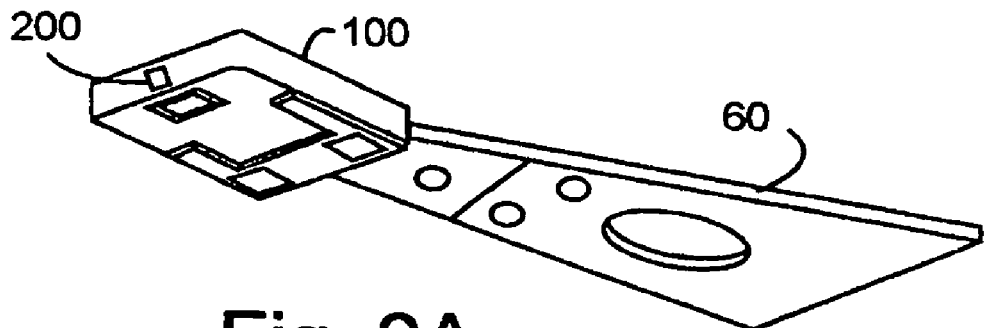
FIG. 2A shows the suspended head gimbal assembly of FIGS. 1A and 1B.

FIG. 2A shows the suspended head gimbal assembly 60 of FIGS. 1A and 1B, containing a slider 100, which includes the read-write head 200.

The hard disk drive 10 often uses at least the voice coil actuators including 20-66 of FIGS. 1A to 2A, to position their read-write heads over specific tracks.

The read-write heads 200 are embedded in the sliders 100, as shown in FIG. 2A. Each slider 100 mounts on a head gimbal assembly 60, which floats a small distance off the rotating disk surface 12, shown in FIGS. 1A to 1B, on an air bearing. The rotating disk surface 12 interacting with the slider 100 forms the air bearing.

Voice coil actuators are further composed of a fixed magnet actuator 20, interacting with a time varying electromagnetic field induced by the voice coil 32, to provide a lever action via the actuator axis 40. The lever action acts to move the actuator arms 50-56 positioning the head gimbal assemblies 60-66 over specific tracks with speed and accuracy. Actuator assemblies 30 typically include the voice coil 32, the actuator axis 40, at least one of the actuator arms 50-56 and their head gimbal assemblies 60-66. An actuator assembly 30 may have as few as one actuator arm 50. A single actuator arm 52 may connect with two head gimbal assemblies 62 and 64, each with at least one head slider 100.

Head gimbal assemblies 60-66 are typically made by rigidly attaching a slider 100 to a head suspension, with a flexure providing electrical interconnection between the read-write head in the slider and the disk controller circuitry. The head suspension is the visible mechanical infrastructure of 60-66 in FIGS. 1A to 2A.

Figure 2B:
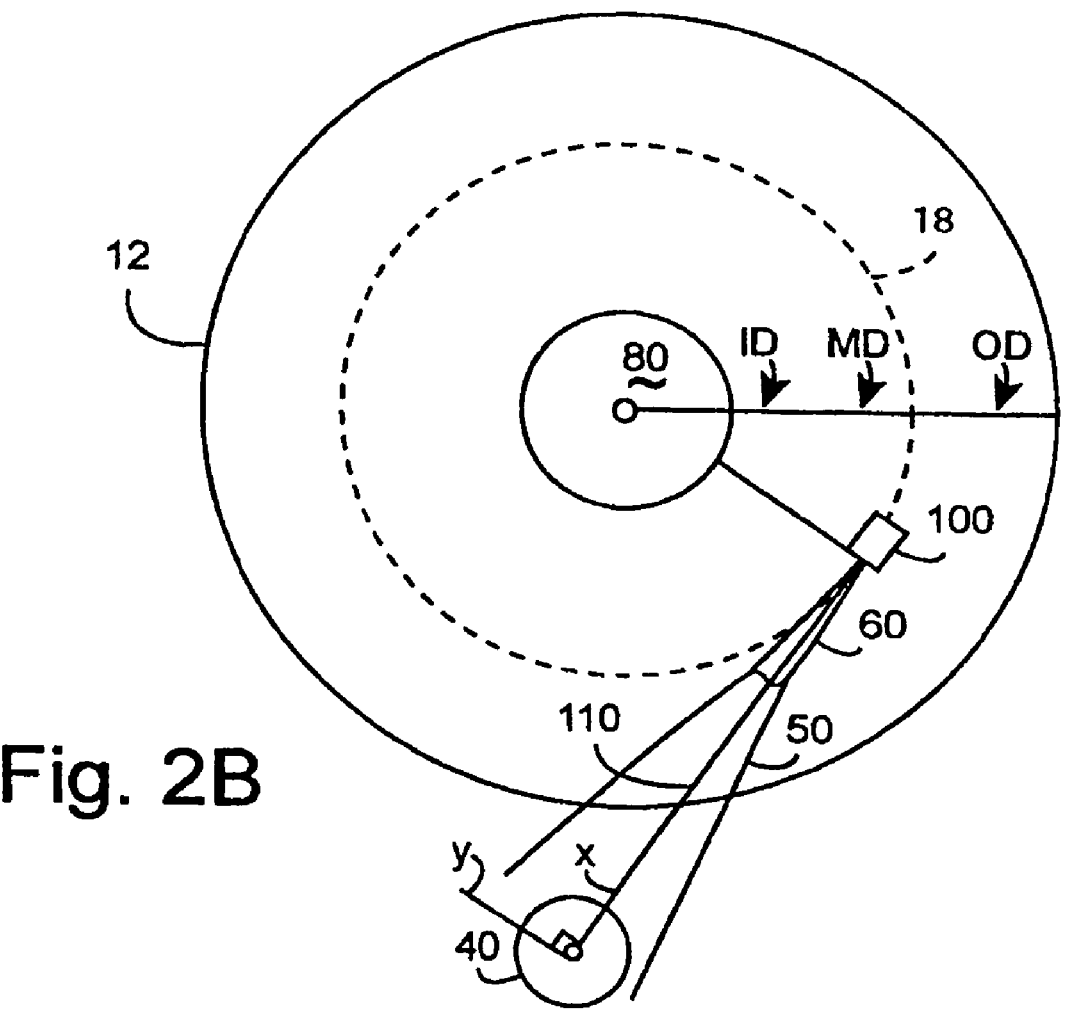
FIG. 2B shows the relationship between the principal axis of an actuator arm with respect to a radial vector from the center of rotation of spindle hub for the hard disk drive of FIGS. 1A and 1B.

FIG. 2B shows the relationship between the principal axis 110 of an actuator arm 50 with respect to a radial vector 112 from the center of rotation of spindle hub 80. The actuator arm assembly 50-60-100, pivots about the actuator axis 40, changing the angular relationship between the radial vector 112 and the actuator principal axis 110. Typically, an actuator arm assembly 50-60-100 rotates through various angular relationships.

The farthest inside position of the actuator assembly is the Inside Position denoted herein as ID. The position where radial vector 112 approximately makes a right angle with the principal axis 110 is the Middle Position, denoted herein as MD. The farthest out position where the read-write head 100 accesses the disk surface 12 is the Outside Position, denoted herein as OD.

As shown in FIG. 2B, the X axis is preferably situated along the principal axis 110 of the actuator arm. The Y axis preferably intersects the X axis at essentially the actuator pivot 40. When the actuator positions the slider 100 so that the read-write head 200 is at MD, the radial vector 112 is essentially parallel to the Y axis. Physical track 18 is shown near MD, but physical tracks exist from ID to OD, throughout the disk surface 12.

Figure 2C:
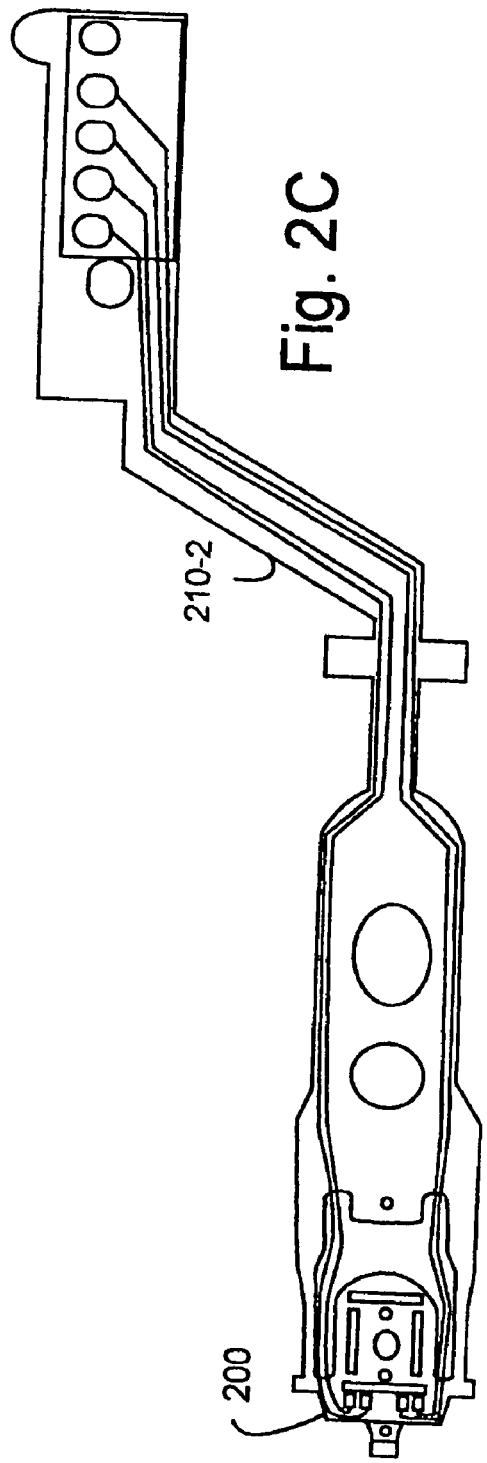
FIG. 2C shows a typical flexure employed in the head gimbal assembly of FIG. 2A.
Figure 2D:
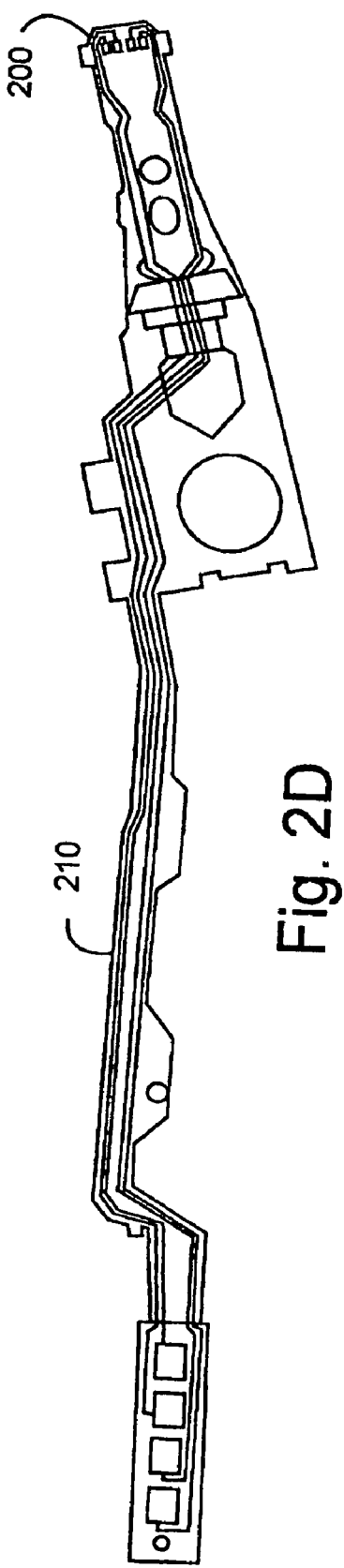
FIG. 2D shows a detail of the flexure of FIG. 2C.

FIGS. 2C and 2D show flexures including a suspension trace 210 providing an electrical interconnection between the read-write head 200 and the analog interface of a hard disk drive.

Figure 2E:
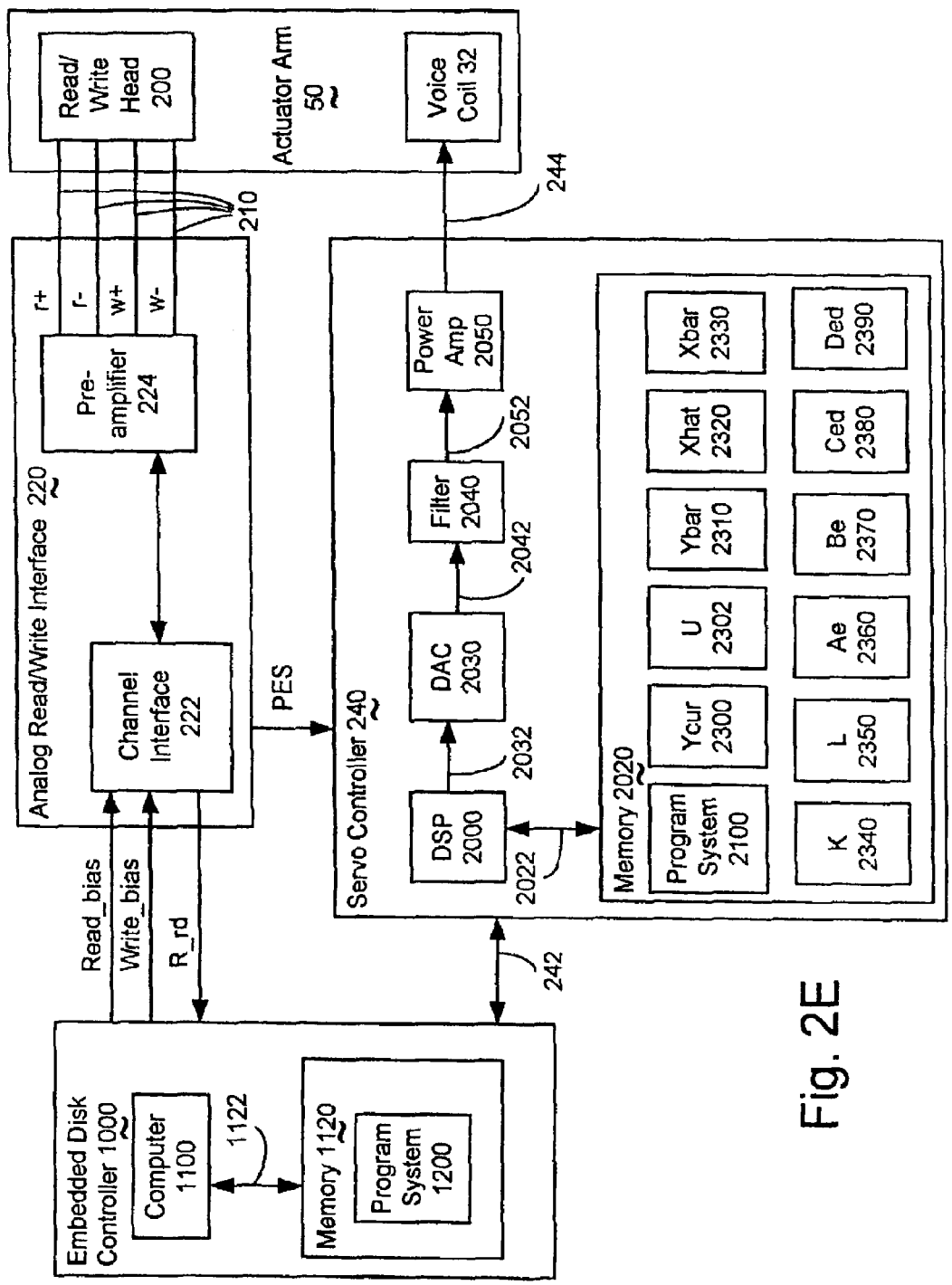
FIG. 2E shows a simplified schematic of a hard disk drive controller used to control the hard disk drive of FIGS. 1A and 1B.

FIG. 2E shows a simplified schematic of a hard disk drive controller 1000 used to control an assembled hard disk drive 10.

Hard disk drive controller 1000 controls an analog read-write interface 220 communicating the resistivity found in the spin valve within the read-write head 200.

The analog read-write interface 220 frequently includes a channel interface 222 communicating with a pre-amplifier 224. The channel interface 222 receives commands, from the embedded disk controller 1000, setting at least the read_bias and the write_bias.

Various hard disk drive analog read-write interfaces 220 may employ either a read current bias or a read voltage bias. By way of example, the resistance of the read-write head is determined by measuring the voltage drop (V_rd) across the read differential signal pair (r+ and r−) based upon the read bias current setting (read_bias), using Ohm's Law.

In FIG. 2E, the channel interface 222 also provides a Position Error Signal (PES) to at least the servo controller 240. The servo controller 240 uses the PES signal to control at least the voice coil 32. The goal is to keep the read-write head 200 close enough to a physical track 18 of FIG. 2B, to support the read-write head 200 communicatively accessing the physical track 18.

In FIG. 2E, the servo controller 240 provides a control feedback loop. The control feedback loop may use any combination of the following. A low pass filter, a high pass filter, a band-pass filter, an operational amplifier, an amplifier, a current source, a delay element, a voltage source, a comparator, a finite state machine, a digital signal processor, an analog-to-digital converter, a channel interface circuit, and a digital-to-analog converter.

In FIG. 2E, the DSP 2000 controls 2032 a DAC 2030, based upon a control variable U 2302 and a current read-write head position Ycur 2300, which is measured. The DAC 2030 often contains a digital-to-analog converter driving either a current source or a voltage source. The output of the DAC 2030 is presented 2042 to a filter 2040. The filter 2040 may include at least one of the following: a low pass filter, a high pass filter, and/or a band-pass filter. The filter 2040 output 2052 is presented to a power amplifier 2050, which drives 244 the voice coil 32.

The invention includes a method of designing and operating a servo-controller 240.

In the past, a state-space controller/observer (or estimator) design was often used for the servo-controller 240. A state space controller is generally regarded as a control mechanism exerting a control 244, based upon feedback and an internal state, often held in memory 2020. The feedback is shown in FIG. 2E as 242 and/or PES. The internal state includes a control variable U 2303 residing in memory 2020.

These state-space or discrete-time state estimators can be implemented in two forms. One form is the so-called prediction estimator that estimates the state variable based on the plant output and the control of the previous sampling period. The other form is called the current estimator, which uses the current time step measurement to estimate the state variables. The plant as used herein refers to the voice coil actuator interacting with the rotating disk surface(s) to create the current read-write head position Ycur 2300, as shown in FIGS. 1A to 2E.

Prediction estimator equations have a more direct relationship with the internal dynamics of the hard disk drive. The prediction estimator equations are a discrete time step form of a continuous-time state observer model. However, the current estimator equations can be derived by means of a discrete Kalman filter formalism with a predetermined knowledge of the current measurements. Today, the current estimator is the predominant hard disk drive servo control model. Its estimates are regarded as more reliable for small computational delays.

The prior art includes several proposed techniques to incorporate the computational delay into control systems design. One of the most commonly adopted techniques is to use the input-delayed model in the state estimator's prediction stage as discussed in "Digital Control of Dynamic Systems" third edition, by Franklin, et. al. referred to hereafter as Franklin. While the state estimation is more reliable, it cannot compensate for the delay in the state feedback law.

An outgrowth of this technique modifies the feedback law to include the one-sample delayed control signal as in the following references. K. S. Rattan, "Compensating for Computational Delay in Digital Equivalent of Continuous Control Systems," *IEEE Trans. on Automatic Control,* Vol. 34, No. 8, 1989, referred hereafter as Rattan. And T. Mita, "Optimal Digital Feedback Control Systems Counting Computation Time of Control Laws," *IEEE Trans. on Automatic Control,* Vol. AC-30, No. 6, 1985 referred to hereafter as Mita.

Rattan develops a similar method for a discrete-equivalent design. However, these methods complicate the servo design, with the potential to increase computational delay, as well as to complicate and therefore slow the development process.

Traditionally, delay is modeled as follows. From the continuous-time point of view, the presence of computation delay $T_d$ is modeled using an ideal transport delay element $e^{-T_d s}$. In most of the literature, this delay element commonly precedes the voice-coil motor (VCM) dynamics. This leads to the following input-delayed state-space representation of the plant dynamics for the voice coil actuator 30 interacting with the rotating disk surfaces 12:

$$\dot{x}(t) = A_p x(t) + B_p u(t - T_d)$$

$$y(t) = C_p x(t) \qquad (1)$$

Here $(A_p, B_p, C_p)$ are the system matrices of the actual head positioning system dynamics for the hard disk drive. The state vector is x(t). The symbol u(t) is the control input such as the Voice Coil Magnet (VCM) current applied to the voice coil 32 shown in FIGS. 1A, 1B and 2E. y(t) is the output, which is the head position shown in FIG. 2B. The "dot" represents the first time derivative of the state vector x(t).

$(A_p, B_p, C_p)$ usually are not exactly known and are often of very high dimension. For actual control design, a practical model (denoted e.g. Ae, Be,Ce) will be used that is of smaller order—usually 3—and contains position, velocity, and unknown bias force. The flexure cable 210 shown in FIGS. 2C and 2D is the predominant source of unknown bias force.

Franklin documents the most popular approach accounting for input delay, which is the input-delay model. The time instant at which the head position is sampled is believed to coincide with the discrete-time index of the sampled system. This is the justification for subtracting the delay $T_d$ from the control signal u(t).

The discrete version of the input-delayed plant model in (1) is found in Franklin:

$$x[k+1]=A_e x[k]+B_{e0}u[k]+B_{e1}u[k-1]$$

$$y[k]=C_e x[k]. \quad (2)$$

Figure 3A:
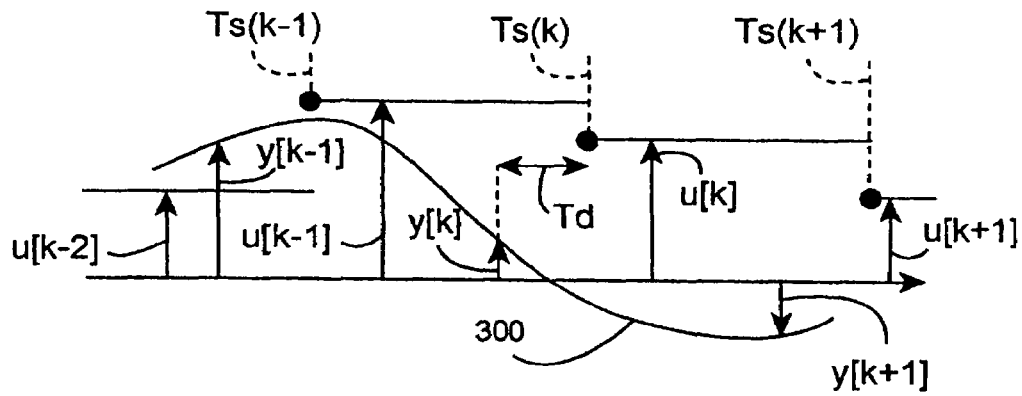
FIG. 3A shows a simplified timing diagram of discrete-time controllers of FIG. 2E with computational time delay.

The derivation of (2) can be understood with reference to FIG. 3A. Here, $(A_e, B_e, C_e)$ represent the system matrices of the plant model for control design, which may possibly contain some augmented states for bias prediction. Use of this delay-present plant equation (2) in the current estimator formulation yields:

$$\hat{x}[k]=\bar{x}[k]+L(y[k]-C_e\bar{x}[k]),$$

$$\bar{x}[k+1]=A_e x[k]+B_{e0}u[k]+B_{e1}u[k-1]. \quad (3)$$

As the track density (TPI) of hard disk drives increases, the requirement for servo positioning accuracy becomes ever higher. This requirement forces the sampling rate to be increased. At the same time, more sophisticated control algorithms need to be used to minimize the Track Mis-Registration (TMR) as the track density, TPI, increases. For these reasons, the computation time delay is no longer negligibly small.

A portion of each hard disk drive's accessible data is reserved to identify the read-write head location. Increasing the sampling rate above certain thresholds requires reducing the data available for use by a computer accessing the hard disk drive, which reduces the market value of the hard disk drive. This market constraint significantly limits the sampling frequency, while at the same time, the TPI continues to grow.

Today's hard disk drive control systems tend to use A/D sampling in the range of 24K samples per second. Contemporary control algorithms can require 80 to 90 percent of the sampling period to complete their calculation of the next control. For these reasons, the computation time delay is no longer negligibly small.

The invention accounts for transport delays, such as computation time delay, in the state estimator and in the whole control system.

The transport delay is defined herein as the time lag between the idealized time of the hard disk drive plant output (position) sampling and the time at which the corresponding control becomes effective at the input of the plant model. The transport delay may include, but is not limited to, at least one of the following: the analogue-to-digital (and vice-versa) conversion time, the demodulation time, the computational time, and a time-lag due to finite bandwidth power amplification.

FIG. 3A shows a simplified timing diagram of the discrete-time controllers 240 of FIG. 2E including the computational time delay.

In FIG. 3A, the continuous position 300 of the read-write head 200 over the rotating surface 12 shown in FIGS. 2A-2B is measure at times U[k−1], U[k], and U[k+1], which are spaced Ts apart in time. Td represents the delay between sampling the read-write head position y[k] and the discrete time assertion 244 of the control variable U[k].

Some of the following figures show flowcharts of at least one method of the invention, possessing arrows with reference numbers. These arrows will signify of flow of control, and sometimes data. These control and/or data flows support implementations including, but not limited to the following. At least one program operation or program thread executing upon a computer. Inferential links in an inferential engine. State transitions in a finite state machine. And dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return. Traversal of a higher node in an inferential graph. Popping of a previously stored state in a finite state machine. Return to dormancy of the firing neurons of the neural network.

A computer as used herein will include, but is not limited to an instruction processor. The instruction processor includes at least one instruction processing element and at least one data processing element, each data processing element controlled by at least one instruction processing element.

A Digital Signal Processor (DSP) will refer to at least one computer and/or at least one finite state machine.

Figure 3B:
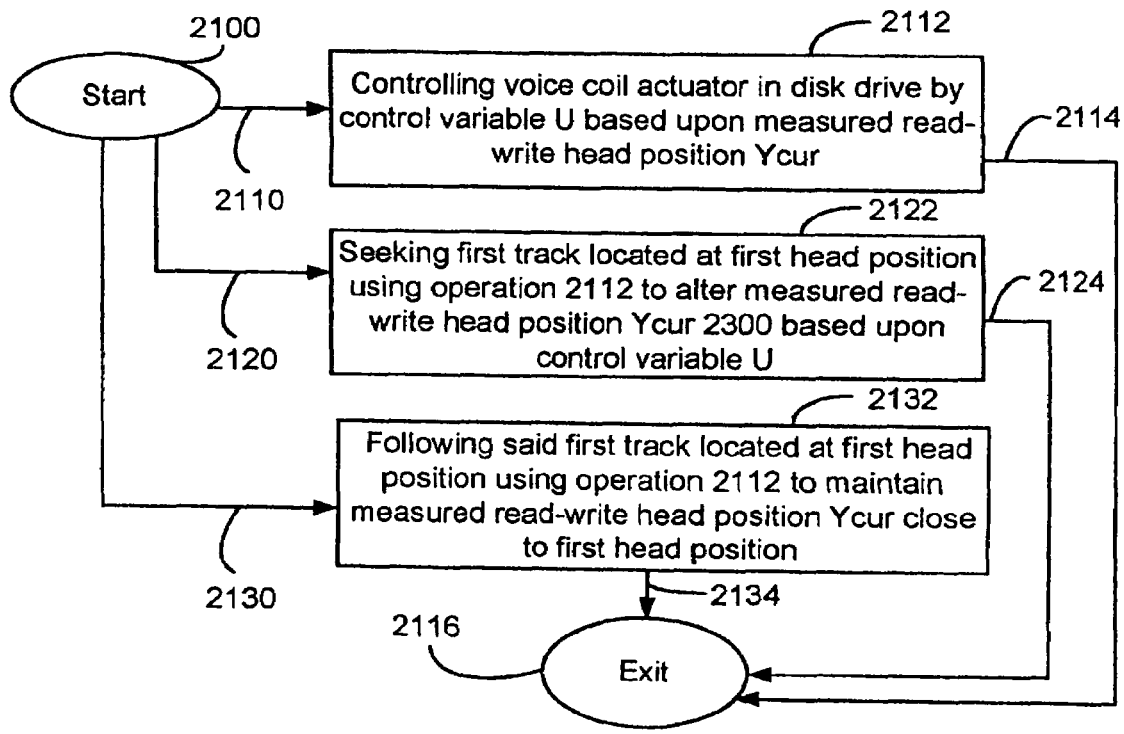
FIG. 3B shows a detail flowchart of the program system of FIG. 2E.

FIG. 3B shows a detail flowchart of program system 2100 of FIG. 2E directing the DSP 2000 to use a control variable U to control the voice coil actuator including 20-66 in the hard disk drive 10. The control drives the circuit, including 2032-2030-2042-2040-2052-2050-244 of FIG. 2E, which drives the voice coil 32. The voice coil 32 interacts with the fixed magnet 20 to leverage the actuator assembly 30 which then positions the read-write head 200 over the track 18 on the rotating disk surface 12 of FIG. 2B.

Operation 2112 controls the voice coil actuator by a control variable U 2302 based upon a measured read-write head position Ycur 2300.

Operation 2122 seeks a first track located at a first head position by using operation 2112 to control the voice coil actuator. Operation 2112 controls the voice coil actuator to alter the measured read-write head position Ycur 2300 to the first head position.

Operation 2132 follows the first track located at the first head position by using operation 2112. Operation 2112 controls the voice coil actuator to maintain the measured read-write head position Ycur 2300 close to the first head position based upon the control variable U 2302.

In FIG. 2E and 3B, control variable U 2302 numerically represents the electrical power exerted by the power amplifier 2050 presented 244 to the voice coil 32. As used herein, numerical representations may include any combination of fixed point and floating numerical formats and arithmetic operations. The voice coil 32 in turn induces an electromagnetic field actuating a mechanical force upon the actuator arm 50 with respect to the fixed magnet 20. U 2302 may be a numeric representation of current. The current required to seek a physical track is often up to 700 milliAmp (mA). The current required to follow a physical track is often less than 20 mA. The invention also includes U 2302 numerically representing voltage.

In FIGS. 2E and 3B, the Ycur 2300 represents the measured read-write head position.

The invention collectively makes use of Ybar 2310, Xhat 2320, Xbar 2330, K 2340, L 2350, Ae 2360, Be 2370, Ced 2380, and Ded 2390, in a fashion which speaks specifically to the inventive matter. These elements, and their relationshi p with Ycur 2300 and U 2302, will first be discussed in terms of the control system equations, and then discussed as a method of operation as part of the discussion of FIG. 7.

Returning to the issue of modeling delay. The output of the plant model may incorporate transport delay with the hard disk drive 10 as follows:

$$\dot{x}(t) = A_p x(t) + B_p u(t)$$

$$y(t) = C_p x(t - T_d) \quad (4)$$

This formulation identifies the discrete-time index of the discretized system with the instant at which the computed control signal becomes effective to the plant.

The first equation of (4), is known as the state evolution equation. This equation is delay-free in this output-delay formulation. This property serves as the basis of the invention's Delay-Accommodating Estimator (DAE).

Two types of estimators can be based on the two delay-present model representations presented.

Type I: Conventionally, the control input is generated in the same way as used in a usual state/observer framework, without delay consideration. That is, for a state regulator with regulator gain K, $$u[k] = -K\hat{x}[k]. \quad (5)$$

This controller cannot prevent the one-sample-delayed state $\bar{x}[k]$ from affecting the closed-loop system (see the state prediction equation in (3)). This may result in degradation of the stability margin.

A controller of the following form may act as a partial compensation to this problem:

$$u[k] = -\hat{K}\hat{x}[k] - k_1 u[k-1] \quad (6)$$

where $\hat{K} \in R^{1 \times n}$ and $k_1 \in R$ are controller gains to be determined shortly. R refers to the real numbers, $R^n$ refers to an n dimensional vector space over R, and $R^{m*n}$ refers to an m*n dimensional vector space over R. In view of (3), the closed-loop system can be rendered to behave as the ideal one without transport delay, provided that $$B_{e0} u[k] + B_{e1} u[k-1] = -B_e K \hat{x}[k] \quad (7)$$

for each k. For any choice of gain pair ($\hat{K}, \hat{k}_1$) in (6), it is generally impossible to satisfy (7) for each k. Nonetheless, (7) can still be approximated in a minimum-norm sense by choosing $$\hat{K} = B_{e0}^+ B_e K, \hat{k} = B_{e0}^+ B_{e1} u[k-1] \quad (8)$$

where $B^+$ is the left pseudo-inverse of a matrix B defined, by $B^+ \triangleq (B^T B)^{-1} B^T$, where B has full column rank. A more general formula involving the singular value decomposition of B can also be used, which does not require B to have full column rank.

Besides the design method discussed above, an LQR formulation can be used for determining the controller gains. This was done in S. Weerasooriya and D. T. Phan, "Discrete-Time LQG/LTR Design and Modeling of a Hard disk drive Actuator Tracking Servo System," *IEEE Trans. Industrial Electronics*, Vol. 42, No. 3, 1995, referred to hereafter as Weersooriya.

Type II. This invention's method, called "Delay-Accommodating Estimator" (DAE) herein, is based on the output-delay model given in (4). This approach uses the following discrete-time variable definitions:

$$x[k] \triangleq x(kT_s), u[k] \triangleq u(kT_s), y[k] \triangleq C_e x[kT_s - T_d] \quad (9)$$

The state variable's time index will be assumed to agree with that of the control signal (see FIG. 3A). To obtain the discrete version of (4), also define $x_m[k] \triangleq x(kT_s - T_d)$. Then $$x[k] = e^{T_d A} x_m[k] + \int_{kT_s - T_d}^{kT_s} e^{A(kT_s - \tau)} B_e \, d\tau u[k-1] \quad (10)$$

$$= e^{T_d A} x_m[k] + \int_0^{T_d} e^{\lambda A_e} B_e \, d\lambda u[k-1]$$

where x follows the delay-free state evolution equation:

$$x[k+1] = A_e x[k] + B_e u[k]. \quad (11)$$

Now, the following output equation is obtained by using (10):

$$y[k] = C_{ed} x[k] + D_{ed} u[k-1] \quad (12)$$

where the matrices are defined by $$C_{ed} \triangleq C_e e^{-T_d A_e}, D_{ed} \triangleq -C_e e^{-T_d A_e} \int_0^{T_d} e^{\lambda A_e} B_e \, d\lambda. \quad (13)$$

Applying the current state estimator equation to the new discrete-time plant given by (11) and (12) yields $$\hat{x}[k] = \bar{x}[k] + L(y[k] - \bar{y}[k])$$

$$\bar{x}[k+1] = A_e \hat{x}[k] + B_e u[k] \quad (14)$$

where the variable y[k] can be pre-calculated in the stage of state prediction according to $$\bar{y}[k+1] = C_{ed} \bar{x}[k+1] + D_{ed} u[k] \quad (15)$$

In Equation (14), $\bar{x}[k]$ is a predicted version of the state variable x, and $\hat{x}[k]$ is the estimate of the state obtained by correcting the prediction with current information.

Equation (11) shows the ideal state equation, the delay-free state feedback law can be implemented by simply using the state estimate in (14). In this way, the time delay is automatically accommodated.

An additional advantage of this DAE is that the estimator state equation is simplified compared to the estimator in Type I. This is quite helpful in practical implementation, where a multi-rate control strategy may be utilized.

FIGS. 4A to 5B show the impact of using the DAE examined through computer simulations. These Figures use Bode plots of the servo control systems based upon the prior art and the invention.

Bode plots are a common way to represent the frequency response of a system. A system's frequency response is defined as the magnitude and phase difference between an input sinusoidal signal and the system's output sinusoidal signal. In the Bode plots that follow, the horizontal axis of both upper and lower charts is in frequency, with units of Herz (Hz) displayed on a logarithmic scale.

The upper logarithmic chart of each of these Figures shows gain, and the lower logarithmic chart shows phase shift. The vertical axis of the upper charts is in decibels (dB). The vertical axis of the lower charts is in degrees. A decibel (dB) is defined as $20*\log_{10}$(Magnitude).

Gain margin is defined as the change in gain (found in the upper chart) required to cause the hard disk drive system to become unstable.

Phase margin is defined as the phase shift required to cause the hard disk drive system to be unstable. The phase margin is the difference in phase between the frequency with a gain of 0 dB and 180°, as determined by the Bode plot.

The dotted vertical line in the following Bode plots identifies the phase cross over frequency $f_{gc}$, which is the frequency giving a phase of 180°. The gain margin is the difference in magnitude curve and 0 dB at the point corresponding to the phase cross over frequency.

Figure 4A:
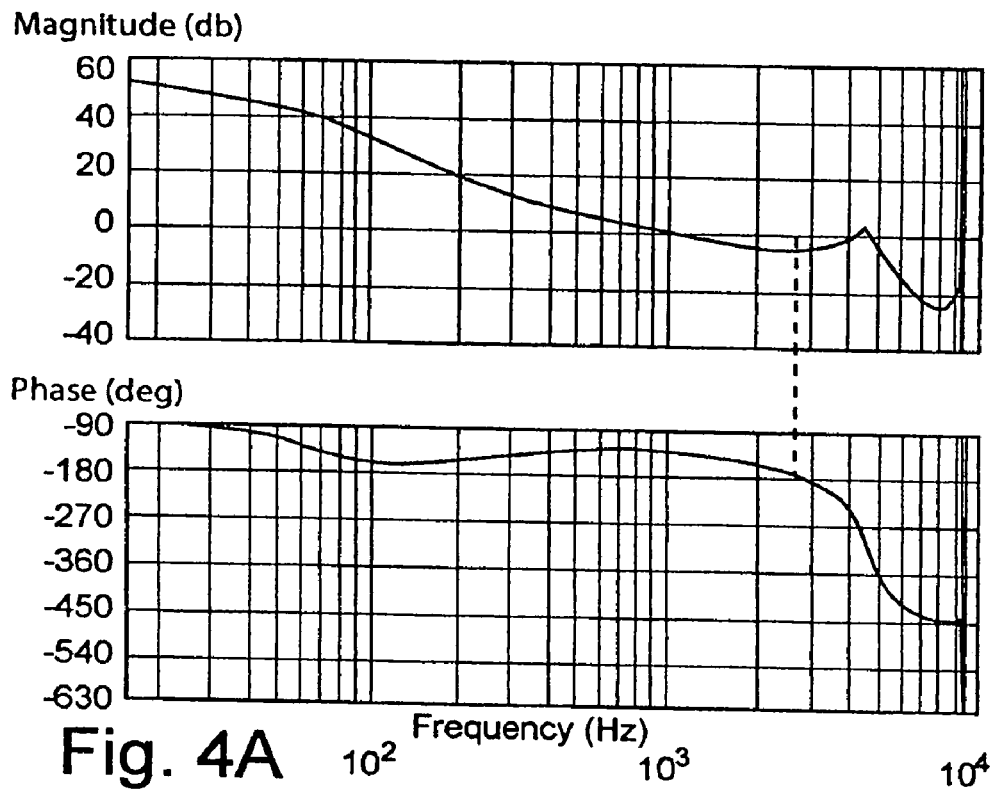
FIG. 4A shows the bode plots of simulating an ideal plant with standard control as found in the prior art.

FIG. 4A shows the Bode plots of simulating a state-space controller referred to as the ideal plant with standard control as found in the prior art. The state-space controller uses an ideal actuator model featuring no delay as a standard controller.

In FIG. 4A, the gain margin is 5.9442 dB at 2663.6 Hz, and the phase margin is 42.775 degrees at 1008.1 Hz.

Figure 4B:
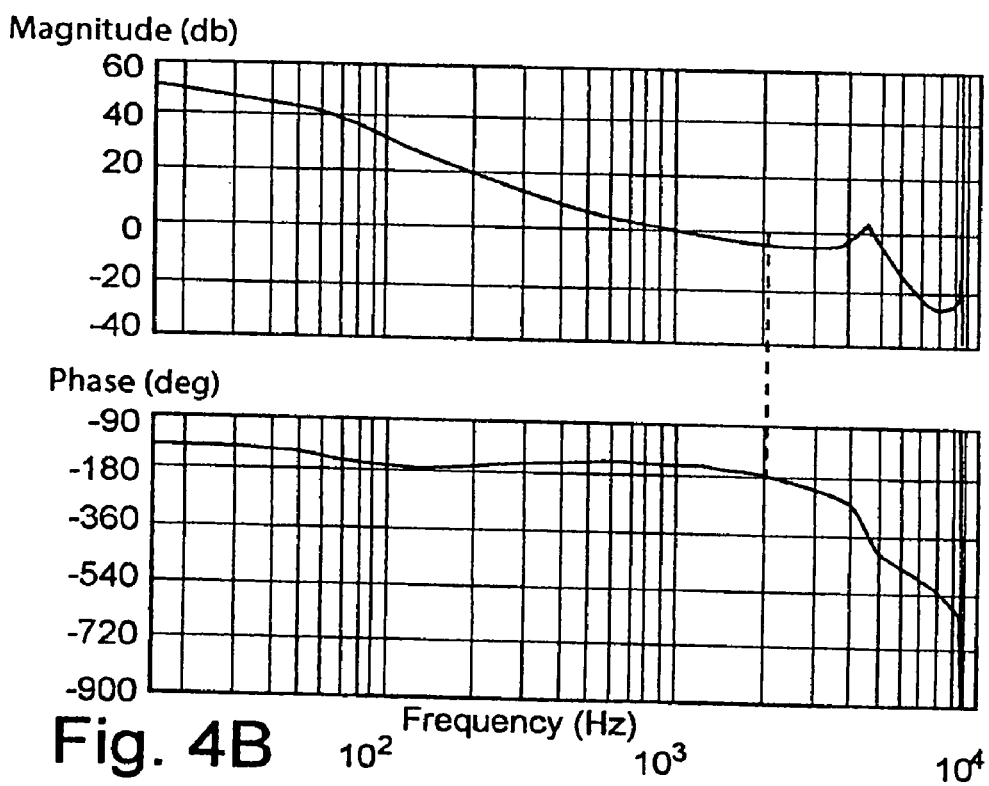
FIG. 4B shows the bode plots of simulating the delay plant with standard control as found in the prior art.

FIG. 4B shows the Bode plots of simulating a state-space controller referred to as the delay plant with standard control as found in the prior art. The state-space controller uses a delay-present actuator model with standard controller design.

In FIG. 4B, the gain margin is 5.0633 dB at 2057.9 Hz, and the phase margin is 33.702 degrees at 1008.1 Hz.

Figure 5A:
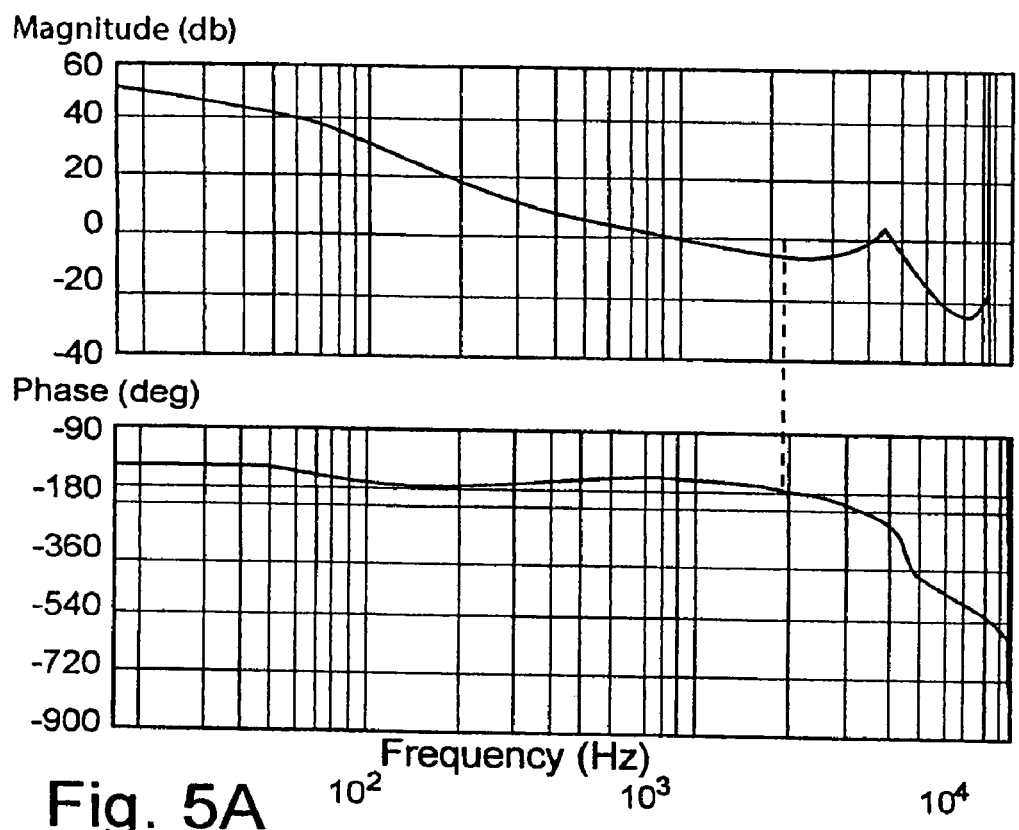
FIG. 5A shows the bode plots of simulating the delay plant with delay model estimator.

FIG. 5A shows the Bode plots of simulating a state-space controller referred to as the delay plant with delay model estimator. The state-space controller uses a delay-present actuator model accounting for delay only at state-prediction stage as found in the prior art.

In FIG. 5A, the gain margin is 4.7617 dB at 2150.8 Hz, and the phase margin is 35.965 degrees at 1006.8 Hz.

Figure 5B:
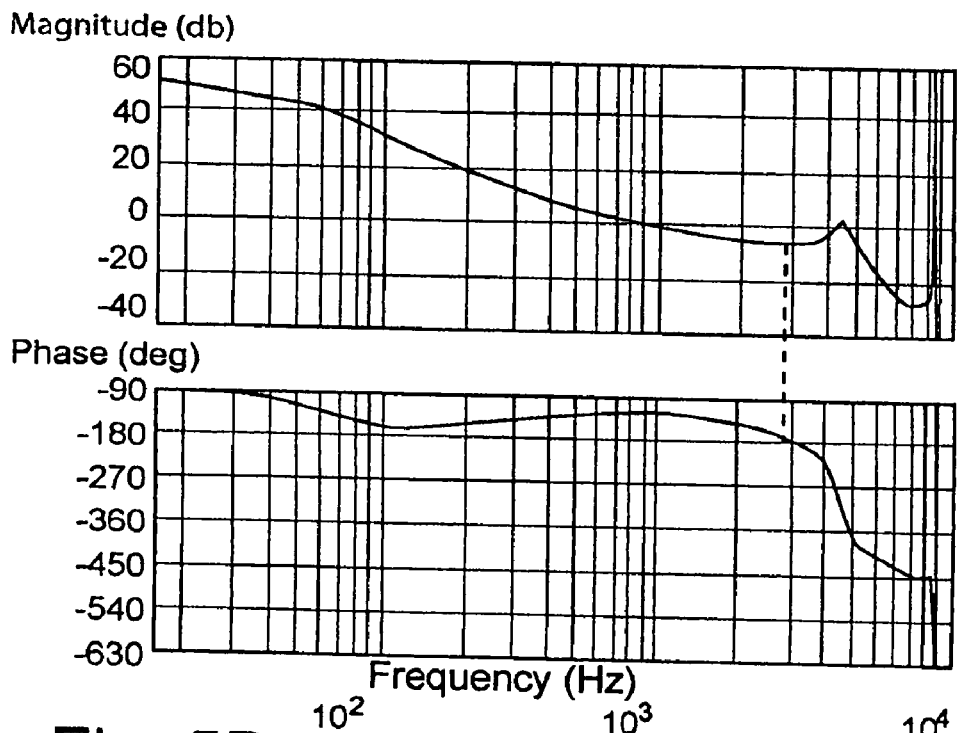
FIG. 5B shows the bode plots of simulating a state-space controller designed according to a delay-present actuator with the invention's delay-accommodating estimator (DAE)

FIG. 5B shows the Bode plots of simulating a state-space controller designed according to a delay-present actuator with the invention's delay-accommodating estimator (DAE).

In FIG. 5B, the gain margin is 5.7177 dB at 2895.4 Hz, and the phase margin is 47.826 degrees at 933.25 Hz.

As shown in FIG. 4B compared with FIG. 4A, disregarding the computation delay results in a significant degradation of phase margin (from 43 degrees to 34 degrees).

As shown in FIG. 5A, incorporating the delay model into the prediction equations as in (3) slightly recovers the phase margin to 36 degrees, at the cost of noticeable reduction of gain margin.

As shown in FIG. 5B, application of DAE, assuming exact knowledge of the delay time $T_d$, leads to a significant recovery of stability margins (gain margin and "first" phase margin). The DAE also reduces the open-loop crossover frequency with the same feedback gains.

While these simulations are indicative, one skilled in the art will recognize that exact knowledge of $T_d$ is typically unavailable, and the delay dynamics are not exactly the same as the transport model. Nonetheless, the simulation results clearly demonstrate the usefulness of DAE design in recovering stability margins of the closed-loop system.

The invention's method was tested on an 80 GB hard disk drive manufactured by the assignee, Samsung Electronics, Co. Ltd. The delay-accommodating estimator of type II was implemented and compared with the conventional state feedback controller. The conventional controller models the computation delay as in the state prediction model shown in the FIG. 4B.

A comparison was made for an open-loop bandwidth of 950 Hz. The bandwidth was increased to 1.1 kHz to see how well the controllers performed for boosted bandwidth. The resulting on-track PES statistics were measured to compare each controller's performance in terms of TMR capability. The adaptive feed forward controller was disabled for the rejection of a particular set of repeatable run-outs, to permit a fair comparison of controllers. The experimental results are summarized in Table One.

TABLE ONE

Summary of experimental results

| | 950 Hz | | 1100 Hz | |
|---|---|---|---|---|
| | Current | DAE | Current | DAE |
| $f_{gc}$ (Hz) | 959 | 989 | 1102 | 1084 |
| PM (deg) | 30.9 | 35.4 | 30.6 | 34.0 |
| GM (dB) | 4.8 | 5.0 | 3.9 | 4.5 |
| ESF Peak | 2.5 | 2.4 | 2.8 | 2.7 |
| RRO | 9.1 | 9.1 | 6.7 | 6.6 |
| NRRO | 10.8 | 9.8 | 8.9 | 8.7 |
| PES STD | 14.1 | 13.4 | 11.1 | 10.9 |

In Table One, $f_{gc}$ indicates the gain crossover frequency, also known as servo bandwidth herein. PM is the Phase margin. GM is the gain margin. ESF Peak is the peak amplitude of the error sensitivity function (ESF).

In Table One, RRO indicates Repeatable Run Out errors associated with track following, which repeat on every revolution of the disk surface. NRRO indicates Non-Repeatable Run Out errors associated with track following, which do not repeat with every disk surface revolution.

In Table One, PES STD indicates the standard deviation of the Position Error Signal.

Figure 6A:
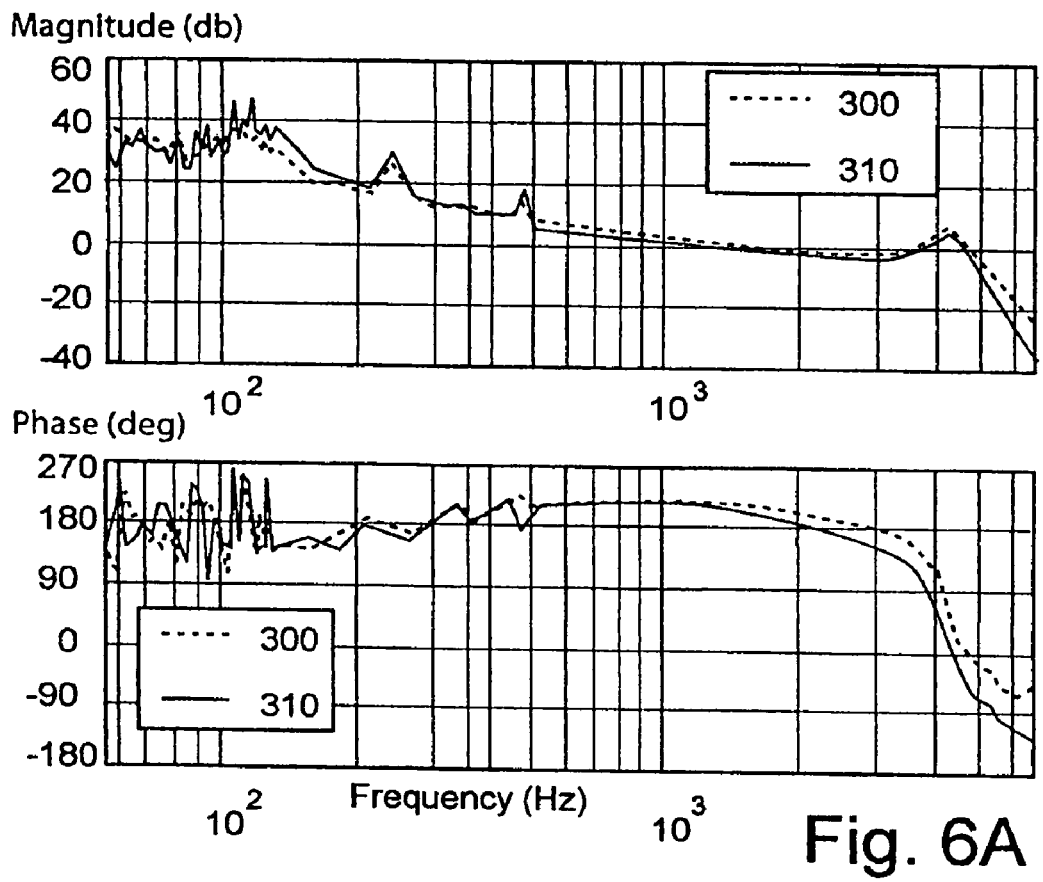
FIG. 6A shows a comparison of the open-loop transfer functions as bode plots experimentally derived for a prior art design and the DAE based controller design.

FIG. 6A shows a comparison of the open-loop transfer functions as Bode plots experimentally derived for the conventional controller design (labeled 300) and the DAE based controller design (labeled 310).

Figure 6B:
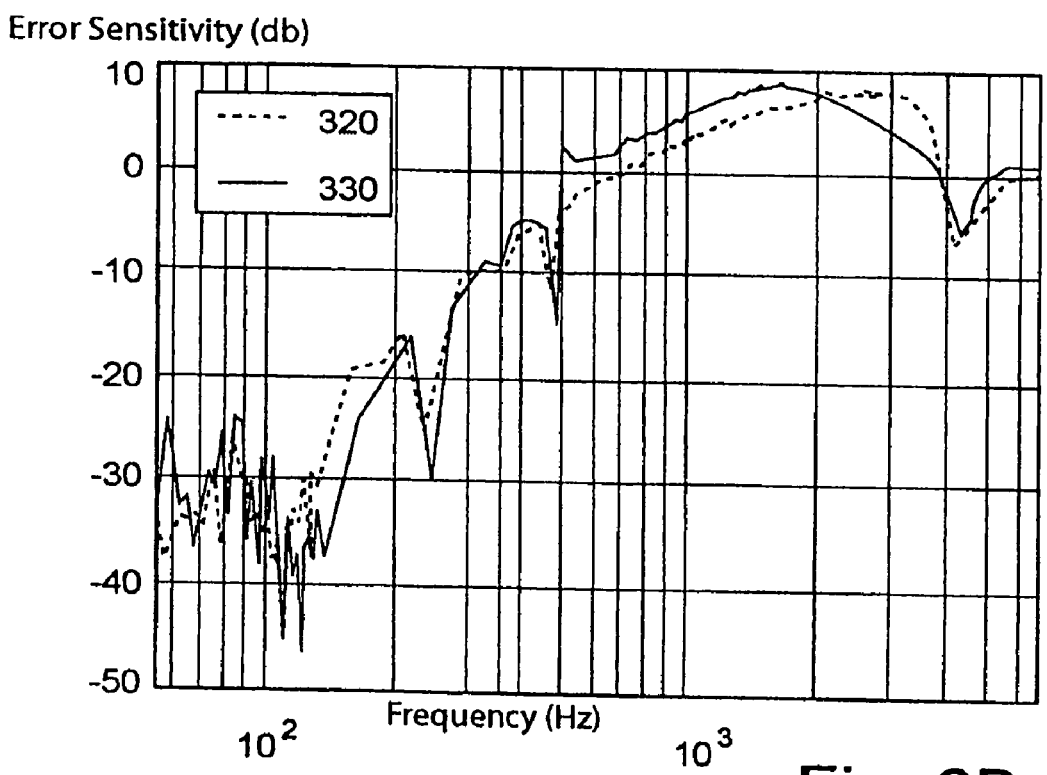
FIG. 6B shows a comparison of the error sensitivity functions experimentally derived for the prior art design and the DAE based controller design.

FIG. 6B shows a comparison of the error sensitivity functions experimentally derived for the conventional controller design (labeled 320) and the DAE based controller design (labeled 330).

As predicted in the simulation, the use of DAE significantly recovered both the phase margin and the gain margin compared to the conventional controller, which partially accounts for time delay. It is important that this recovery occurred with almost the same open-loop crossover frequency.

In FIG. 6A, the phase margin is shown increased near the cross over frequency. However, in the high-frequency region, some boost of gain is observed.

The reduction of phase margin translates to the decrease of the error sensitivity peaking shown in FIG. 6B. This effectively attenuates the amplification ratio of disk-mode related disturbances, resulting in the reduction of standard deviation of the non repeatable PES as shown in Table One. The experimental results confirm that the DAE is practical and useful in achieving the high-bandwidth servo systems required for high-TPI hard disk drives.

Experimental results using the commercial hard drive, as well as the simulation results, show that the inventive method effectively improves the hard disk drive control system stability. This is done by increasing the phase margin and the gain margin by 3-4° and 0.3 dB, respectively.

Figure 7A:
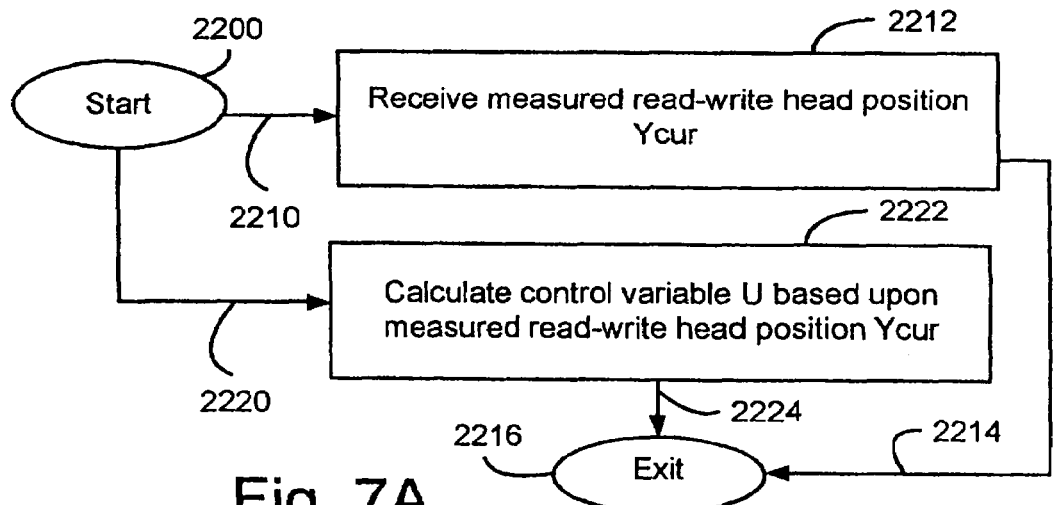
FIG. 7A shows a detail flowchart of FIG. 3B.

FIG. 7A shows a detail flowchart of operation 2112 of FIG. 3B further controlling the voice coil actuator contained in the hard disk drive by a control variable U 2302 based upon the measured read-write head position Ycur 2300.

In FIG. 7A, operation 2212 obtains the measured read-write head position Ycur 2300 shown in FIG. 2E. Obtaining the measured read-write head position Ycur 2300 may include a variety of interactions involving any or all of the channel interface 222, the embedded disk controller 1000, and resources of the servo controller 240.

In FIG. 7A, operation 2222 calculates the control variable U based upon the measured read-write head position Ycur 2300. Operation 2222 will be first discussed in terms of the control system equations and their derivation, and then in terms of the invention's method in FIG. 7B.

Figure 7B:
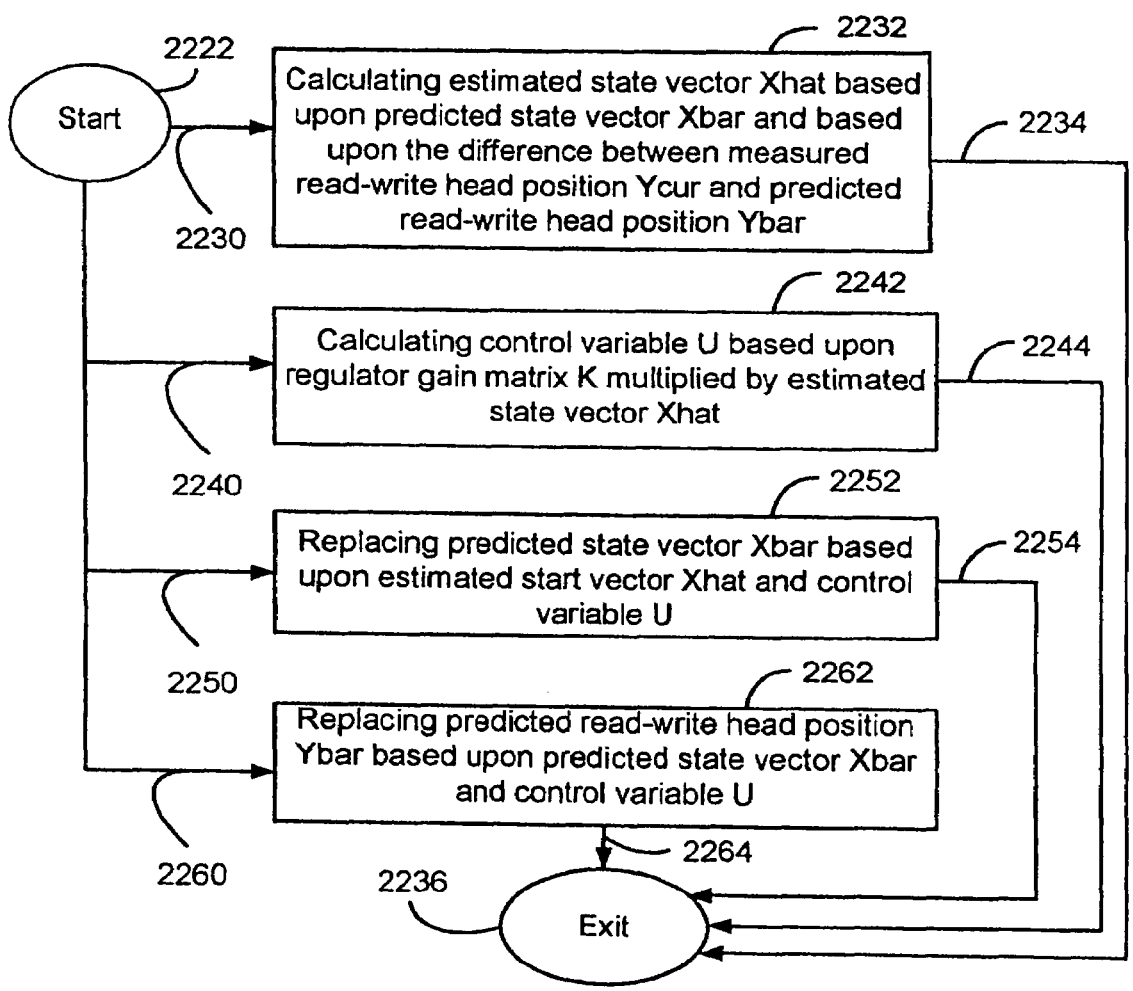
FIG. 7B shows a detail flowchart of FIG. 7A.

FIG. 7B shows a detail flowchart of operation 2222 of FIG. 7A calculating the control variable U 2302 based upon the measured read-write head position Ycur 2300 of FIGS. 2E and 7A.

In FIG. 7B, operation 2232 performs calculating an estimated state vector Xhat 2320 based upon a predicted state vector Xbar 2330 and based upon the difference between the measured read-write head position Ycur 2300 and a predicted read-write head position Ybar 2310 of FIG. 2E. Operation 2232 is described in the first line of Equation (14), further using the L 2350 of FIG. 2E.

In FIG. 7B, operation 2242 performs calculating the control variable U 2302 based upon a regulator gain matrix K multiplied by the estimated state vector Xhat 2320 of FIG. 2E. Operation 2242 is described in Equation (4) further using the regulator gain matrix K 2340 of FIG. 2E.

In FIG. 7B, operation 2252 performs replacing the predicted state vector Xbar 2330 based upon the estimated start vector Xhat 2320 and based upon the control variable U 2302 of FIG. 2E. Operation 2252 is described in the second line of Equation (14), using Ae 2360 and Be 2370 of FIG. 2E.

In FIG. 7B, operation 2262 performs replacing the predicted read-write head position Ybar 2310 based upon the predicted state vector Xbar 2330 and based upon the control variable U 2302 of FIG. 2E. Operation 2262 is described in equation (15) using Ced 2380 and Ded 2390 of FIG. 2E.

Note that specific embodiments of the invention may use differing values for the regulator gain matrix K 2340 and the L 2350 of FIG. 2E and equations (4) and (14). Franklin contains a thorough discussion of the derivation of K and L via pole placement.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A servo controller for a hard disk drive, comprising:
means for obtaining a measured read-write head position Ycur; and
means for calculating a control variable U based upon said measured read-write head position Ycur performing the steps:
calculating an estimated state vector Xhat based upon a predicted state vector Xbar and based upon the difference between said measured read-write head position Ycur and a predicted read-write head position Ybar;
calculating said control variable U based upon a regulator gain matrix K multiplied by said estimated state vector Xhat;
replacing said predicted state vector Xbar based upon said estimated state vector Xhat and based upon said control variable U; and
replacing said predicted read-write head position Ybar based upon said predicted state vector Xbar and based upon said control variable U;
wherein each member of a state vector collection includes a read-write head position version, a read-write head velocity version and an unknown bias force version;
wherein said state vector collection includes said estimated state vector Xhat and said predicted state vector Xbar;
wherein said hard disk drive includes a disk surface accessed by a read-write head at said measured read-write head position Ycur;
wherein said disk surface contains multiple physical tracks at a Track Per Inch (TPI); and
wherein said TPI is at least 80,000 tracks per inch.

2. The servo controller of claim 1, comprising, for each step of claim 1, a means for implementing said corresponding step.

3. The servo controller of claim 1,
wherein the step calculating said estimated state vector Xhat is further comprised of the step of:
setting said estimated state vector Xhat to approximate said predicted state vector Xbar added to an L multiplied by the difference between said measured read-write head position Ycur and said predicted read-write head position Ybar;
wherein said L relates said difference between said measured read-write head position Ycur and said predicted read-write head position Ybar to said estimate state vector Xhat.

4. The servo controller of claim 1,
wherein the step replacing said predicted state vector Xbar is further comprises the step:
setting said predicted state vector Xbar to approximate an Ae multiplied by said estimated state vector Xhat added to Be multiplied by said control variable U;
wherein said Ae relates said estimated state vector XHat to said predicted state vector Xbar; and
wherein said Be relates said control variable U to said predicted state vector Xbar.

5. The servo controller of claim 1,
wherein the step replacing said predicted read-write head position Ybar is further comprised of the step of:
setting said predicted read-write head position Ybar to approximate an Ced multiplied by said predicted state vector Xbar added to a Ded multiplied by said control variable U;
wherein said Ced relates said predicted state vector Xbar to said predicted read-write head position Ybar; and
wherein said Ded relates said control variable U to said predicted read-write head position Ybar.

6. The servo controller of claim 1, further comprising:
means for controlling a voice coil actuator contained in said hard disk drive by a control variable U based upon a measured read-write head position Ycur.

7. The servo controller of claim 6,
wherein at least one of said means is implemented using at least one member of the collection comprising: a low pass filter, a high pass filter, a band-pass filter, an operational amplifier, an amplifier, a current source, a delay element, a voltage source, a comparator, a finite state machine, a digital signal processor, an analog-to-digital converter, a channel interface circuit, and a digital-to-analog converter.

8. The servo controller of claim 6,
wherein the means for controlling said voice coil actuator is implemented as a program system comprised of program steps residing in a memory accessibly coupled to a Digital Signal Processor (DSP); wherein said DSP controls a voice coil directing the positioning of said voice coil actuator;
wherein said program system is comprised of at least one program step implementing at least one member of the collection comprising:

means for obtaining said measured read-write head position Ycur; and means for calculating said control variable U based upon said measured read-write head position Ycur.

9. The hard disk drive using said servo controller of claim 6, comprising:

said voice coil actuator; and said servo controller controlling said voice coil actuator by said control variable based upon said measured read-write head position Ycur.

10. A method generating a control variable U for controlling a voice coil actuator in a hard disk drive, comprising the steps of:

calculating an estimated state vector Xhat based upon a predicted state vector Xbar and based upon the difference between a measured read-write head position Ycur and a predicted read-write head position Ybar;

calculating said control variable U based upon a regulator gain matrix K multiplied by said estimated state vector Xhat;

replacing said predicted state vector Xbar based upon said estimated state vector Xhat and based upon said control variable U; and replacing said predicted read-write head position Ybar based upon said predicted state vector Xbar and based upon said control variable U;

wherein each member of a state vector collection includes a read-write head position version, a read-write head velocity version and an unknown bias force version;

wherein said state vector collection includes said estimated state vector Xhat and said predicted state vector Xbar;

wherein said hard disk drive includes a disk surface accessed by a read-write head at said measured read-write head position Ycur;

wherein said disk surface contains multiple physical tracks at a Track Per Inch (TPI); and wherein said TPI is at least 80,000 tracks per inch.

11. The method of claim 10, further comprising the step: obtaining said measured read-write head position Ycur.

12. The method of claim 11, further comprising at least one member of the collection comprising the steps:

seeking a first track located at a first head position by directing said servo controller to alter said measured read-write head position Ycur based upon said control variable U; and following said first track located at said first head position by directing the servo control to maintain said measured read-write head position Ycur close to said first head position based upon said control variable U.

13. The method of claim 10, wherein the step calculating said estimated state vector Xhat is further comprised of the step of:

setting said estimated state vector Xhat to approximate said predicted state vector Xbar added to an L multiplied by the difference between said measured read-write head position Ycur and said predicted read-write head position Ybar;

wherein said L relates said difference between said measured read-write head position Ycur and said predicted read-write head position Ybar to said estimated state vector Xhat.

14. The method of claim 10, wherein the step replacing said predicted state vector Xbar is further comprised of the step of:

setting said predicted state vector Xbar to approximate an Ae multiplied by said estimated state vector Xhat added to Be multiplied by said control variable U;

wherein said Ae relates said estimated state vector XHat to said predicted state vector Xbar; and wherein said Be relates said control variable U to said predicted state vector Xbar.

15. The method of claim 10, wherein the step replacing said predicted read-write head position Ybar is further comprised of the step of:

setting said predicted read-write head position Ybar to approximate an Ced multiplied by said predicted state vector Xbar added to a Ded multiplied by said control variable U; wherein said Ced relates said predicted state vector Xbar to said predicted read-write head position Ybar; and wherein said Ded relates said control variable U to said predicted read-write head position Ybar.

16. The control variable U as a product of the process of claim 10.

17. A method of controlling said voice coil actuator in said hard disk drive based upon said control variable U of claim 16, comprising the steps:

seeking a first track located at a first head position by directing said servo controller to alter said measured read-write head position Ycur based upon said control variable U; and following said first track located at said first head position by directing the servo control to maintain said measured read-write head position Ycur close to said first head position based upon said control variable U.

18. An implementation for generating a control variable U to control a voice coil actuator in a hard disk drive comprising:

means for calculating an estimated state vector Xhat based upon a predicted state vector Xbar and based upon the difference between a measured read-write head position Ycur and a predicted read-write head position Ybar;

means for calculating said control variable U based upon a regulator gain matrix K multiplied by said estimated state vector Xhat;

means for replacing said predicted state vector Xbar based upon said estimated state vector Xhat and based upon said control variable U; and means for replacing said predicted read-write head position Ybar based upon said predicted state vector Xbar and based upon said control variable U;

wherein each of said estimated state vector Xhat and said predicted state vector Xbar both include a read-write head position version, a read-write head velocity version and an unknown bias force version;

wherein said hard disk drive includes a disk surface accessed by a read-write head at said measured read-write head position Ycur; and wherein said disk surface contains multiple physical tracks at a Track Per Inch (TPI) of at least 80,000 tracks per inch.

19. The implementation of claim 18, wherein at least one of said means is implemented using at least one member of the collection comprising: a low pass filter, a high pass filter, a band-pass filter, an operational amplifier, an amplifier, a current source, a delay element, a voltage source, a comparator, a finite state machine, a digital signal processor, an analog-to-digital converter, a channel interface circuit, and a digital-to-analog converter.

20. The implementation of claim 18, further comprising:

a digital signal processor accessibly coupled to a memory and a program system comprising program steps residing in said memory;

wherein said digital signal processor controls said voice coil directing the positioning of said voice coil actuator; and wherein said program system is comprised of at least one program step implementing at least one member of the collection comprising:

means for calculating said estimated state vector Xhat;

means for calculating said control variable U;

means for replacing said predicted state vector Xbar; and means for replacing said predicted read-write head position Ybar.

21. The implementation of claim 20, wherein said program system further comprises the program steps:

calculating said estimated state vector Xhat based upon said predicted state vector Xbar and based upon the difference between said measured read-write head position Ycur and said predicted read-write head position Ybar;

calculating said control variable U based upon said regulator gain matrix K multiplied by said estimated state vector Xhat;

replacing said predicted state vector Xbar based upon said estimated state vector Xhat and based upon said control variable U; and replacing said predicted read-write head position Ybar based upon said predicted state vector Xbar and based upon said control variable U.

* * * * *